United States Patent
Inoue et al.

(10) Patent No.: US 8,570,849 B2
(45) Date of Patent: Oct. 29, 2013

(54) TILT ANGLE ADJUSTMENT METHOD FOR OBJECTIVE LENS AND OPTICAL INFORMATION RECORDING/REPRODUCING APPARATUS

(75) Inventors: Satoshi Inoue, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/096,337

(22) Filed: Apr. 28, 2011

(65) Prior Publication Data

US 2011/0280115 A1  Nov. 17, 2011

(30) Foreign Application Priority Data

May 12, 2010 (JP) .................................. 2010-110256

(51) Int. Cl.
*G11B 7/00* (2006.01)

(52) U.S. Cl.
USPC ...................................................... 369/59.19

(58) Field of Classification Search
USPC ............ 369/53.19, 44.32, 94, 112.02, 112.23
See application file for complete search history.

(56) References Cited

U.S. PATENT DOCUMENTS

| | | | |
|---|---|---|---|
| 5,754,513 A | 5/1998 | Yagi et al. | |
| 2002/0097504 A1* | 7/2002 | Kitamura et al. | 359/719 |
| 2009/0213717 A1* | 8/2009 | Matsuzaki et al. | 369/112.23 |
| 2009/0225643 A1* | 9/2009 | Sugi et al. | 369/112.23 |
| 2010/0074069 A1* | 3/2010 | Iijima et al. | 369/44.32 |
| 2010/0124157 A1* | 5/2010 | Inoue et al. | 369/112.23 |
| 2010/0246343 A1* | 9/2010 | Yamasaki et al. | 369/44.32 |
| 2011/0242948 A1* | 10/2011 | Suzuki et al. | 369/44.26 |
| 2012/0020198 A1* | 1/2012 | Inoue et al. | 369/112.23 |

FOREIGN PATENT DOCUMENTS

JP  2004-171771  6/2004

* cited by examiner

*Primary Examiner* — Thang Tran
(74) *Attorney, Agent, or Firm* — Greenblum & Bernstein, P.L.C.

(57) ABSTRACT

A method for adjusting a tilt angle of an objective lens with respect to one of a multilayer optical disc having a plurality of recording layers and an optical axis of an optical information recording/reproducing apparatus, wherein a use wavelength $\lambda$ and a numerical aperture NA are defined by conditions: $390<\lambda<420$ and $0.75<NA<0.90$. The method includes determining the tilt angle of the objective lens such that a spot quality defined through a predetermined transparent parallel flat plate matches a predetermined standard, and tilting the objective lens to have the determined tilt angle. When t1 represents a thickness of the predetermined transparent parallel flat plate and t2 represents a design protective layer thickness at which a coma caused when off-axis light is incident on the objective lens becomes smallest, t1 and t2 satisfy: $-0.015<t1-t2<0.005$.

16 Claims, 3 Drawing Sheets

TILT ANGLE ADJUSTMENT METHOD FOR OBJECTIVE LENS AND OPTICAL INFORMATION RECORDING/REPRODUCING APPARATUS

BACKGROUND OF THE INVENTION

The present invention relates to a tilt angle adjustment method for adjusting a tilt angle of an objective lens and an optical information recording/reproducing apparatus in which the objective lens is mounted, and particularly to a tilt angle adjustment method suitable for adjusting a tilt angle of an objective lens for a multilayer high recording density optical disc and an optical information recording/reproducing apparatus in which such an objective lens is mounted.

There exist various standards of optical discs, differing in recording density, protective layer thickness, the number of recording layers, and etc. Various types of optical information recording/reproducing apparatuses suitable for recording information to and/or reproducing information from the optical discs based on the various standards have also been proposed and in practical use. Japanese Patent Provisional Publication No. 2004-171771A (hereafter, referred to as JP2004-171771A) discloses an example of an optical information recording/reproducing apparatus suitable for information recording or information reproducing for a multilayer DVD (Digital Versatile Disc). The optical information recording/reproducing apparatus disclosed in JP2004-171771A is configured to suitably correct the spherical aberration caused by the difference between recording layer thicknesses (i.e., thicknesses of protective layers protecting respective recording surfaces of layers). Incidentally, in this specification, the "optical information recording/reproducing apparatuses" include apparatuses for both information reproducing and information recording, apparatuses exclusively for information reproducing, and apparatuses exclusively for information recording.

Recently, further enhancement of the recording density of a recording medium is advancing, and a high recording density optical disc having a further higher recording density than DVD has put in practical use. One of such a high recording density optical disc is BD (Blu-ray Disc). Study for multilayer technology for such a high recording density optical disc has also been made, and standardization of the multilayer high recording density optical disc is advancing.

For information recording or information reproducing for the high recording density optical disc, a laser beam having a short wavelength and an objective lens having a higher NA than that for DVD are used. Therefore, when the high recording density optical disc is used, sensitivity of a coma with respect to decentering of an objective lens and tilting of an optical disc becomes high. In general, a decentering coma caused by decentering of an objective lens and an off-axis coma caused by inclination of an incident light beam due to, for example, an installation error of a LD (Laser Diode), or individual differences or an installation error of a reflection prism can be cancelled by adjusting a tilt angle of the objective lens so as to cause a coma in an inverse direction.

SUMMARY OF THE INVENTION

By applying the above described general coma correcting method to the optical information recording/reproducing apparatus described in JP2004-171771A, the tilt angle of the objective lens is adjusted such that the coma is cancelled at a certain recording layer. Since a single layer high recording density optical disc is in widespread use, the adjustment of the tilt angle of the objective lens is performed with respect to the protective layer thickness of such a single layer high recording density optical disc. However, in this case, a coma is not cancelled (i.e., a coma remains) at another recording layer. With regard to a multilayer high recording density optical disc, the sensitivity of a coma is high, and therefore it becomes difficult to set the coma remaining at another recording layer to fall within a permissible range. That is, it is difficult to apply the above described correcting method to the multilayer high recording density optical disc.

The present invention is advantageous in that it provides a tilt angle adjustment method suitable for adjusting a tilt angle of an objective lens for an optical information recording/reproducing apparatus, and an optical information recording/reproducing apparatus having such an objective lens.

According to an aspect of the invention, there is provided a method for adjusting a tilt angle of an objective lens with respect to one of a multilayer optical disc having a plurality of recording layers and an optical axis of an optical information recording/reproducing apparatus. A use wavelength $\lambda$ (unit: nm) for the multilayer optical disc and a numerical aperture NA of the objective lens being defined by conditions: $390 < \lambda < 420$ ... (1); and $0.75 < NA < 0.90$ ... (2). The method includes determining the tilt angle of the objective lens such that a spot quality defined through a predetermined transparent parallel flat plate matches a predetermined standard, and tilting the objective lens to have the determined tilt angle. In this configuration, when t1 (unit: mm) represents a thickness of the predetermined transparent parallel flat plate and t2 (unit: mm) represents a design protective layer thickness at which a coma caused when off-axis light is incident on the objective lens becomes smallest, t1 and t2 satisfy a following condition:

$$-0.015 < t1 - t2 < 0.005 \tag{3}.$$

With this configuration, by executing the tilt angle adjustment of the objective lens for the multilayer high recording density optical disc using the transparent flat plate having the thickness t1 close to the protective layer thickness t2, it becomes possible to assure the suitable property that the amount of remaining aberration is small in all of the recording layers of the optical disc. When (t1−t2) gets smaller than the lower limit of the condition (3), the property of a widely used high recording density optical disc having the protective layer thickness of 0.100 mm which is thicker than the design protective layer thickness at which the coma caused when the off-axis light is incident on the objective lens becomes minimum deteriorates largely. When (t1−t2) gets larger than the upper limit of the condition (3), a problem arises that the coma and the astigmatism deteriorate considerably in at least one recording layer of the multilayer high recording density optical disc depending on the direction of the off-axis light beam.

When we consider correcting the coma in each recording layer only in a balanced manner, it is optimal to set the protective layer thickness t2 to a center value between the thicknesses of the thickest protective layer and the thinnest protective layer. On the other hand, considering correction of the astigmatism in each recording layer, it is preferable that the protective layer thickness t1 is thinner than the protective layer thickness t2. For this reason, the condition (3) is defined such that the range of a negative value is wider than the range of a positive value. When we put a same value on each recording layer, it is preferable to further widen the range of a negative value. However, when we consider a single layer high recording density optical disc having a protective layer of approximately 0.100 mm, a multilayer high recording density optical disc having two recording layers having respective protective layer thicknesses of approximately 0.075 mm and 0.100 mm, a multilayer high recording density optical disc having three or more recording layers having respective protective layer thicknesses ranging from 0.050 mm to 0.100 mm, we need to put importance on the property at the recording layer with the protective layer thickness of 0.100 which all of types of high recording density optical discs have. When (t1−t2) gets smaller than the lower limit of the condition (3), the property at the protective layer thickness of 0.100 mm to which importance should be attached deteriorates largely.

In at least one aspect, the method may further comprise observing, through the predetermined transparent parallel flat plate, a wavefront of light from the objective lens. In the step of determining the tilt angle, the tilt angle is determined based on the observed wavefront. In the step of tilting the objective lens, the objective lens is tilted to the determined tilt angle. The step of observing the wavefront, the step of determining and the step of tilting are repeated until the observed wavefront matches the predetermined standard. A factor for determining the tilt angle is not limited to the observation of the wavefront. For example, the factor for determining the tilt angle may be a spot shape observed through the predetermined transparent flat plate or a measured jitter. In any case, the substantially same tilt angle of the objective lens is obtained.

In at least one aspect, t1 and t2 may satisfy a following condition:

$$-0.015 < t1 - t2 < 0.000 \quad (4).$$

In at least one aspect, when tmin represents a smallest protective layer thickness of all of protective layer thicknesses of the plurality of recording layers, and tmax represents a largest protective layer thickness of all of the protective layer thicknesses of the plurality of recording layers, t2 may satisfy a following condition:

$$tmin < t2 < tmax \quad (5).$$

With this configuration, it is possible to assure a more suitable off-axis property in all the recording layers of the multilayer high recording density optical disc.

Considering the fact that in general a protective layer thickness of each recording layer of the multilayer high recording density optical disc, t1 and t2 may respectively satisfy following conditions:

$$0.045 < t1 < 0.105 \quad (6); \text{ and}$$

$$0.060 < t2 < 0.100 \quad (7).$$

In at least one aspect, t1 and t2 may respectively satisfy following conditions:

$$0.070 < t1 < 0.080 \quad (8); \text{ and}$$

$$0.065 < t2 < 0.095 \quad (9).$$

With this configuration, it becomes possible to achieve a suitable property in each recording layer of the multilayer high recording density optical disc.

In at least one aspect, a coma component of a wavefront observed through the predetermined transparent parallel flat plate when the spot quality matches the predetermined standard is substantially equal to zero.

According to another aspect of the invention, there is provided an optical information recording/reproducing apparatus, comprising: a light source which emits a light beam having a wavelength λ (unit: nm); and an objective lens of which tilt angle has been adjusted in accordance with the one of the above described methods, the objective lens being configured to converge the light beam having the wavelength λ onto each recording surface of the multilayer optical disc having a plurality of recording layers.

With this configuration, the optical information recording/reproducing apparatus having the objective lens of which tilt angle has been suitably adjusted can be achieved.

According to another aspect of the invention, there is provided an optical information recording/reproducing apparatus, including a light source which emits a light beam having a wavelength λ (unit: nm), and an objective lens configured to converge the light beam having the wavelength λ, onto each recording surface of the multilayer optical disc having a plurality of recording layers. In this configuration, when t2 (unit: mm) represents a design protective layer thickness at which a coma caused when off-axis light is incident on the objective lens becomes smallest and t3 (unit: mm) represents a protective layer thickness of the multilayer optical disc at which a coma caused when information recording or information reproducing is executed for the multilayer optical disc becomes smallest, t2 and t3 satisfy a following condition:

$$-0.015 < t3 - t2 < 0.005 \quad (10).$$

With this configuration, the optical information recording/reproducing apparatus having the objective lens of which tilt angle has been suitably adjusted can be achieved.

In at least one aspect, t2 and t3 may satisfy a following condition:

$$-0.015 < t3 - t2 < 0.000 \quad (11).$$

In at least one aspect, the optical information recording/reproducing apparatus may further include a spherical aberration correcting element configured to correct a spherical aberration which varies depending on a difference in protective layer thickness between the plurality of recording layers of the multilayer optical disc.

In at least one aspect, the spherical aberration correcting element may be a coupling lens which changes a diverging angle of the light beam having the wavelength λ, emitted by the light source by moving in an optical axis direction.

DETAILED DESCRIPTION OF THE
EMBODIMENTS

Hereinafter, an embodiment according to the invention are described with reference to the accompanying drawings.

Figure 1:
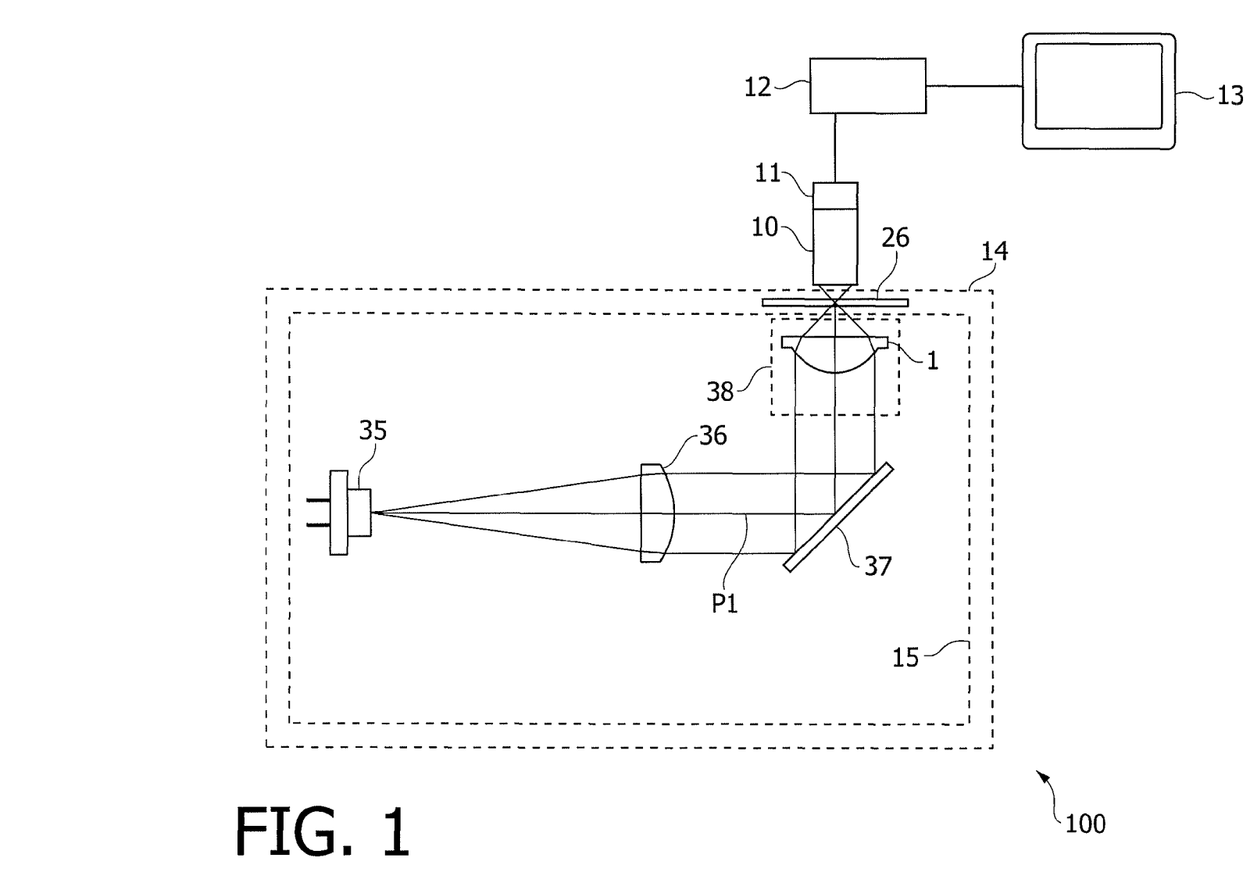
FIG. 1 is a block diagram generally illustrating a configuration of a tilt angle adjustment apparatus for an objective lens according to an embodiment of the invention.

FIG. 1 is a block diagram generally illustrating a configuration of a tilt angle adjustment apparatus for an objective lens (hereafter, simply referred to as a tilt angle adjustment apparatus 100) according to the embodiment of the invention. The tilt angle adjustment apparatus 100 includes a microscope 10, an imaging camera 11, a controller 12 and a monitor display 13. In the embodiment, an optical information recording/reproducing apparatus 14 on which an optical pick-up 15 is mounted is set in the tilt angle adjustment apparatus 100. In the optical puck-up 15, an objective lens 1 for a multilayer high recording density optical disc which is a target to be adjusted is installed. In FIG. 1, each of the optical pick-up 15 and the optical information recording/reproducing apparatus 14 is illustrated by a rectangular box (dashed line) for the sake of simplicity. In addition to the objective lens 1 for the multilayer high recording density optical disc, the target to be adjusted by the tilt angle adjustment apparatus 100 includes an objective lens for a multilayer disc which has a lower recording density than that of the multilayer high recording density optical disc and is based on a different type of standard, and an objective lens compatible with a plurality of types of standards differing in protective layer thickness.

One of examples of the high recording density optical discs is BD. In the following, explanation is given on the assumption that the high recording density optical disc is BD. When a use wavelength is defined as λ (unit: nm) and a numerical aperture NA of the objective lens 1 is defined as NA, the following conditions (1) and (2) are satisfied.

$$390 < \lambda < 420 \quad (1)$$

$$0.75 < NA < 0.90 \quad (2)$$

In the optical information recording/reproducing apparatus 14, a laser source 35 for information recording or information reproducing for the multilayer high recording density optical disc is installed. In a tilt angle adjustment process according to the embodiment, the laser source 35 is used as a laser source for spot quality measurement. That is, the laser source 35 is used to examine whether the quality of a beam spot formed by a laser beam which has passed through the objective lens 1 after the tilt angle adjustment matches a predetermined standard. A laser beam P1 emitted by the laser source 35 passes though a coupling lens 36, and is incident on the objective lens 1 via a mirror 37.

The coupling lens 36 is provided in the optical pick-up 15 to be movable in an optical axis direction by a driving mechanism (not shown). Depending on a moving distance of the coupling lens 36 in the optical axis direction, the coupling lens 36 changes an angle of divergence of the laser beam P1. The spherical aberration which changes depending on the difference between protective layer thicknesses of respective protective layers of the multilayer high recording density optical disc, the temperature change or the wavelength variation is cancelled by the change of the angle of divergence of the laser beam P1. It should be noted that the coupling lens 36 may be replaced with an optical element of a different type which corrects the spherical aberration which changes depending on the difference between protective layer thicknesses of respective protective layers of the multilayer high recording density optical disc. The optical element of a different type includes a liquid crystal aberration correcting element and a diffraction optical element.

The objective lens 1 is supported in a lens holder 38 such that the tilt angle of the objective lens 1 with respect to the lens holder 38 is adjustable by a tilt angle adjusting mechanism (not shown). Similarly to the optical information recording/reproducing apparatus 14 and the optical pick-up 15, in FIG. 1 the lens holder 38 is illustrated by a rectangular box for the sake of simplicity. In the optical information recording/reproducing apparatus 14, an adjustment optical disc 26 (a transparent parallel flat plate) is placed for the tilt angle adjustment process according to the embodiment. The adjustment optical disc 26 serves to emulate (a protective layer of) an actual optical disc to be used. The laser beam P1 reflecting from the mirror 37 is incident on the microscope 10 via the objective lens 1 and the adjustment disc 26.

The imaging camera 11 picks up a spot image provided by the microscope 10 and outputs the spot image to the controller 12. The controller 12 executes signal processing for the spot image. On a screen of the monitor display 13, the spot image processed by the controller 12 is displayed. Focusing and positioning in a plane orthogonal to the optical axis of the objective lens 1 is performed for the microscope 10 so that the spot image on the adjustment optical disc 26 can be displayed on the screen of the monitor display 13. The positioning in the place orthogonal to the optical axis means, for example, adjusting the position of the microscope 10 such that the distribution of the light amount of the laser beam P1 passed through the adjustment disc 26 becomes substantially symmetric with respect to a tracking direction of the objective lens 1 and a radial direction which is perpendicular to the tracking direction. With this configuration, it becomes possible to obtain a beam spot with a small amount of coma.

Next, the tilt angle of the objective lens 1 is determined so that a main lobe of the spot image has a circular shape and the first order ring which appears in a peripheral portion of the main lobe becomes rotationally symmetric with respect to the spot center, and then the objective lens 1 is adjusted to have the determined tilt angle. The tilt angle adjustment of the objective lens 1 is performed while observing the spot image, and when the spot image matches the predetermined spot quality, the objective lens 1 is adhered and fixed to the lens holder 38. The foregoing is a general explanation of the tilt angle adjustment process.

In the above described explanation, the tilt angle adjustment of the objective lens 1 is performed based on the observation results of the spot shape. However, the present invention is not limited to such a configuration. For example, the tilt angle adjustment of the objective lens 1 may be performed while observing a wavefront aberration and a coma with an interferometer so that the wavefront aberration and the coma are minimized. The tilt angle adjustment of the objective lens 1 may be performed while observing a jitter so that the jitter is minimized. Alternatively, the tilt angle adjustment of the objective lens 1 may be performed by measuring the wavefront aberration of the objective lens 1 through a protective layer thickness t1 satisfying a condition (3) indicated below and by calculating the tilt amount based on the measured value and the sensitivity of the objective lens 1.

Objective lenses of a same lot have substantially the same tilt angle to be adjusted. Therefore, the tilt angle adjustment may be performed as follows. First, the above described tilt angle adjustment process is performed only for a limited number of objective lenses, and a laser beam from an autocollimator is irradiated on each of the adjusted objective lenses to obtain a position of reflected light from a flat part of each objective lens. For the remaining lenses, observation of the spot shape is not performed, but the tilt angle adjustment is performed such that the reflected light reappears at the same obtained position. With this configuration, the lead time for the tilt angle adjustment for all the objective lenses can be reduced considerably. It should be noted that detection of the reflected light may be performed with another measuring device in place of the autocollimator.

The tilt angle adjustment of the objective lens may be performed by adjusting a relative tilt angle between the objective lens and the optical disc (the optical axis of an optical system). For example, the objective lens itself may be tilted or the lens holder may be tilted.

Incidentally, when the objective lens to be adjusted is a lens for a single layer disc, the adjustment disc 26 having the thickness corresponding to the protective layer thickness of the single layer disc is selected. On the other hand, regarding the objective lens 1 for the multilayer high recording density optical disc, it is necessary to consider the fact that the recording layers have different protective layer thicknesses and the sensitivity to the aberration is high. Therefore, the thickness of the adjustment disc 26 can not be selected based on the same condition for the objective lens for the single layer disc. In order to assure the suitable off-axis property at all the recording layers, it is necessary to select the adjustment disc 26 having an appropriate thickness and perform the tilt angle adjustment with the selected adjustment disc 26.

In order to assure the suitable off-axis property at all the recording layers of the multilayer high recording density optical disc, the objective lens 1 is designed and the adjustment disc 26 is selected to satisfy the condition (3):

$$-0.015 < t1-t2 < 0.005 \quad (3)$$

where t1 (unit: mm) represents a protective layer thickness of an optical disc used to determine the tilt angle at which the $3^{rd}$ order coma is minimized (=0) (i.e., a protective layer thickness of a multilayer high recording density optical disc targeted by the adjustment disc 26), and t2 (unit: mm) represents a design protective layer thickness having the most suitable off-axis property (i.e., a protective layer thickness at which the $3^{rd}$ order coma caused when off-axis light is incident on a disc becomes smallest). That is, the adjustment disc thickness t1 and the design protective layer thickness t2 are defined to have values which are approximate with respect to each other.

The adjustment disc thickness t1 is equal to a protective layer thickness t3 (unit: mm) of an optical disc for which the $3^{rd}$ order coma caused when the information recording or information reproducing is performed with the optical information recording/reproducing apparatus 14 completed through the above described tilt angle adjustment process is minimized. In other words, the completed optical information recording/reproducing apparatus 14 satisfies a condition (10):

$$-0.015 < t3-t2 < 0.005 \quad (10).$$

In order to suitably perform the tilt angle adjustment of the objective lens 1, following conditions (4) and (11) may be satisfied.

$$-0.015 < t1-t2 < 0.000 \quad (4)$$

$$-0.015 < t3-t2 < 0.000 \quad (11)$$

In another viewpoint, the design protective layer thickness t2 is defined as a protective layer thickness t4 (unit: mm) of an optical disc at which the spherical aberration SA and the offence against the sine condition SC are substantially equal to each other. That is, the objective lens 1 which is to be subjected to the tilt angle adjustment satisfies a condition (12):

$$-0.015 < t1-t4 < 0.005 \quad (12).$$

It is preferable that (t1−t4) satisfies a condition (13):

$$-0.015 < t1-t4 < 0.000 \quad (13).$$

Figure 2:
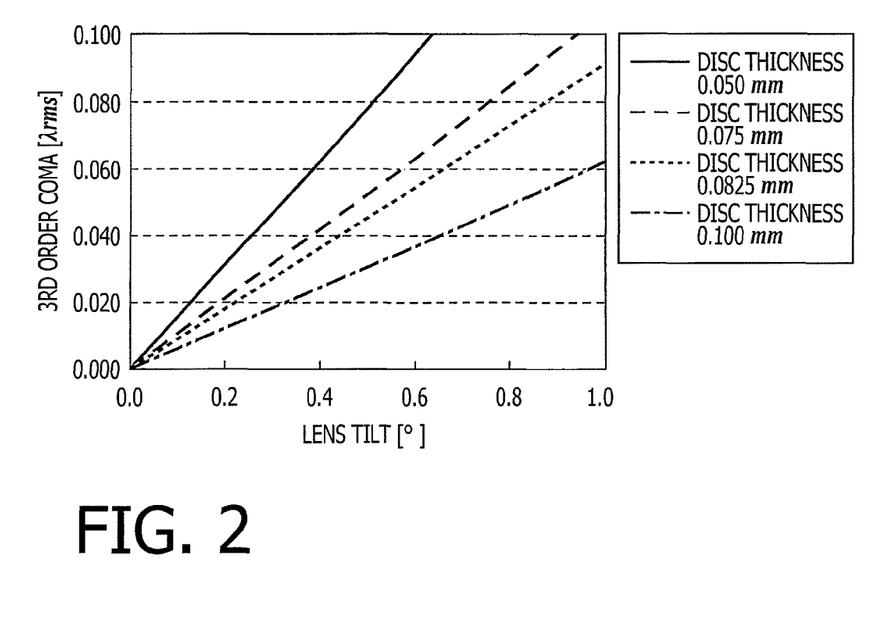
FIG. 2 shows, for each of protective layer thicknesses of an optical disc, a relationship between a tilt angle of an objective lens and a coma.

FIG. 2 shows, for each of protective layer thicknesses of the optical disc, a relationship between the tilt angle of the objective lens 1 and the coma. The property shown in the graph of FIG. 2 is obtained in a state where the spherical aberration has been corrected while moving the coupling lens 36 in accordance with the protective layer thickness of the optical disc. In FIG. 2, the vertical axis represents the $3^{rd}$ order coma (unit: λrms) and the horizontal axis represents the tilt angle (unit: degree). The line types in FIG. 2 respectively correspond to the protective layer thicknesses of the recording layers of the multilayer high recording density optical disc. Specifically, a solid line corresponds to the protective layer thickness of 0.050 mm, a dotted line corresponds to the protective layer thickness of 0.0825 mm, a dashed line corresponds to the protective layer thickness of 0.075 mm, and a chain line corresponds to the protective layer thickness of 0.100 mm.

Since the degree of divergence of the laser beam incident on the objective lens 1 changes when the coupling lens 36 moves, the offence against the sine condition SC changes. Under the assumption that the effective diameter of the objective lens 1 does not change regardless of movement of the coupling lens 36, the amount of coma changes due to change of the NA. As shown in FIG. 2, as the protective layer thickness becomes large, the amount of coma with respect to the tilt angle of the objective lens 1 becomes small. That is, as the adjustment disc thickness t1 becomes small, the tilt angle of the objective lens 1 determined by the adjustment becomes small. Therefore, as the tilt angle becomes small, it becomes more advantageous in regard to decreasing the coma and the astigmatism for all the recording layers of the multilayer high recording density optical disc. For this reason, the condition (3) is defined such that the range of the negative value is wider than the range of the positive value. That is, the adjustment disc 26 with a protective layer thickness smaller than the design protective layer thickness t2 has the wider selection range than that of the adjustment disc 26 with a protective layer thickness larger than the design protective layer thickness t2. When (t1−t2) gets smaller than the lower limit of the condition (3), the off-axis property of the most widely used high recording density optical disc having the protective layer thickness of 0.100 mm (including a single layer high recording density optical disc) deteriorates considerably. When (t1−t2) gets larger than the upper limit of the condition (3), a problem arises that the coma and the astigmatism deteriorate considerably in at least one recording layer of the multilayer high recording density optical disc depending on the direction of the off-axis light beam.

Figure 3A:
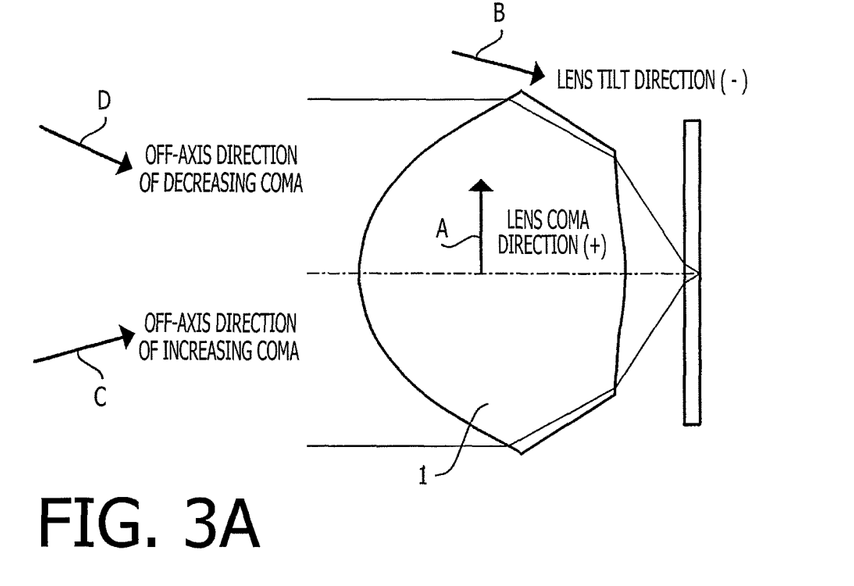
FIGS. 3A and 3B are explanatory illustrations for explaining a relationship between the direction of the coma and the adjustment disc thickness t1 with respect to the design protective layer thickness t2.
Figure 3B:
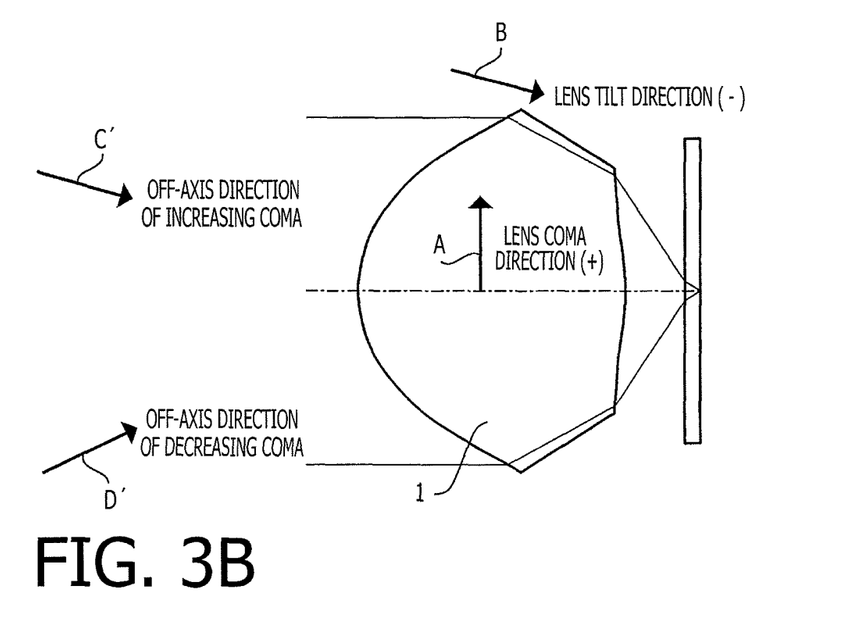

Each of FIGS. 3A and 3B is an explanatory illustration for explaining the relationship between the direction of the coma and the adjustment disc thickness t1 with respect to the design protective layer thickness t2. There are an infinite number of angle combinations of the direction of the coma of the objective lens 1 and the direction of the coma caused by the off-axis light. In FIGS. 3A and 3B, the case where the directions of the coma of the objective lens 1 and the off-axis coma are equal to each other (i.e., the case where the change of the coma is large), and the case (a directly opposite case) where the directions of the coma of the objective lens 1 and the off-axis coma are opposite to each other are shown. In each of FIGS. 3A and 3B, the objective lens 1 has a positive coma having the direction indicated by an arrow A. When the coma caused by the off-axis light and the coma of the objective lens 1 are equivalent to a lens coma direction shown in FIGS. 3A and 3B, the objective lens is tilted in the direction indicated by an arrow B to cancel and correct the remaining coma of the combination of these comas. FIG. 3A considers a case where the adjustment disc thickness t1 is larger than the design protective layer thickness t2, and FIG. 3B considers a case where the adjustment disc thickness t1 is smaller than the design protective layer thickness t2.

In the case of FIG. 3A, when the direction of the off-axis light is equal to the direction of an arrow C, the coma caused by the off-axis light and the coma of the objective lens 1 are in a increasing direction, and therefore the tilt angle of the objective lens 1 for the correction of the coma becomes largest. When the direction of the off-axis light is equal to the direction indicated by an arrow D, the coma caused by the off-axis light and the coma of the objective lens 1 cancel with each other. In the former case, the objective lens 1 needs to be tilted largely to correct a large amount of coma. Furthermore, in the former case, each of the tilting direction of the objective lens 1 and the incident direction of the off-axis light corresponds to a direction in which the astigmatism is caused largely. Therefore, in this case, the astigmatism is caused more largely, which is undesirable. In the latter case, the tilt angle of the objective lens 1 is small, and each of the tilting direction of the objective lens 1 and the incident direction of the off-axis light corresponds to a direction of cancelling the astigmatism. Therefore, in this case, the amount of the astigmatism is small, which is preferable.

In the case of FIG. 3B, when the direction of the off-axis light is equal to the direction of an arrow C', the coma caused by the off-axis light and the coma of the objective lens 1 are in a increasing direction, and therefore the tilt angle of the objective lens 1 for correction of the coma becomes largest. When the direction of the off-axis light is equal to the direction indicated by an arrow D', the coma caused by the off-axis light and the coma of the objective lens 1 cancel with each other, and the tilting amount of the objective lens 1 for correction of the coma becomes smallest. In the former case, the objective lens 1 needs to be tilted largely to correct a large amount of coma. However, since each of the tilting direction of the objective lens 1 and the incident direction of the off-axis light corresponds to a direction in which the astigmatism is cancelled, the astigmatism is small, which is suitable. In the latter case, although, when the tilt angle required for the correction is negative, each of the tilting direction of the objective lens 1 and the incident direction of the off-axis light corresponds to a direction in which the astigmatism is caused largely, the astigmatism can be suppressed because the tilt angle of the objective lens 1 is small. However, regarding an optical disc having a thick protective layer, the amount of coma is large.

When we consider correcting the coma in each recording layer only in a balanced manner, it is optimal that the adjustment disc thickness t1 and the design protective layer thickness t2 are set to be equal to each other. However, as can be seen from the comparison between the two examples in FIGS. 3A and 3B, it is preferable that the adjustment disc thickness t1 is smaller than the design protective layer thickness t2 in order to suppress the astigmatism. Additionally, in this viewpoint, the condition (3) is defined such that the range of the negative value is wider than the range of the positive value.

In order to assure a more suitable off-axis property in all of the recording layers of the multilayer high recording density optical disc, the objective lens 1 may be designed to satisfy a following condition (5):

$$t_{min} < t2 < t_{max} \quad (5)$$

where tmin represents the smallest protective layer thickness of all of the protective layer thicknesses of the recording layers, and tmax represents the largest protective layer thickness of all of the protective layer thicknesses of the recording layers.

When t2 gets lower than the lower limit of the condition (5), the off-axis property in the recording layer of the protective layer thickness tmax deteriorates largely. When t2 gets larger than the upper limit of the condition (5), the off-axis property in the recording layer of the protective layer thickness of tmin deteriorates largely.

Considering the fact that in general a protective layer thickness of each recording layer of the multilayer high recording density optical disc falls within the range of 0.050 mm to 0.100 mm, it is more suitable that the adjustment disc thickness t1 and the design protective layer thickness t2 respectively satisfy the following conditions (6) and (7).

$$0.045 < t1 < 0.105 \quad (6)$$

$$0.060 < t2 < 0.100 \quad (7)$$

In order to have a suitable property in each recording layer of the multilayer high recording density optical disc, it is more preferable to satisfy the following conditions (8) and (9).

$$0.070 < t1 < 0.080 \quad (8)$$

$$0.065 < t2 < 0.095 \quad (9)$$

It is preferable that each of a light source side surface and an optical disc side surface of the objective lens 1 is an aspherical surface. A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), $\kappa$ is a conical coefficient, and $A_4, A_6, \ldots$ represent aspherical coefficients larger than or equal to the fourth order. By forming each surface of the objective lens 1 as an aspherical surface, it becomes possible to appropriately control the aberrations (e.g., the spherical aberration and the coma).

Hereafter, a concrete numerical example (first example) is explained.

Table 1 shows specifications of the objective lens 1 according to the first example. The multilayer high recording density optical disc D1 used in the first example is a three-layer optical disc. Protective layer thicknesses of the respective recoding layers of the multilayer high recording density optical disc D1 are 0.050 mm, 0.075 mm, and 0.100 mm. For design of the objective lens 1, the design protective layer thickness t2 is set to be 0.0825 mm which is a value falls within a range of 0.050 mm to 0.100 mm. Lens surfaces of the objective lens 1 are decentered with respect to each other. The objective lens 1 has the $3^{rd}$ order coma of 0.030 $\lambda$rms and the inclination of the optical axis of the objective lens 1 is 20'.

TABLE 1

| Wavelength (nm) | 406 |
|---|---|
| Focal length (mm) | 1.41 |
| NA | 0.85 |
| Magnification | 0.000 |

Table 2 show a numerical configuration defined for optical components from the objective lens 1 in the optical information recording/reproducing apparatus 14 completed through the above described tilt angle adjustment process. The numerical configuration is defined when the multilayer high recording density optical disc D1 is used.

TABLE 2

| Surface No. | r | d(406 nm) | n(406 nm) | |
|---|---|---|---|---|
| 1 | 0.913 | 1.80 | 1.55903 | Objective Lens |
| 2 | −1.481 | 0.40 | | |
| 3 | ∞ | 0.0875 | 1.62096 | Optical Disc D1 |
| 4 | ∞ | — | | |

In Table 2, surfaces #1 and #2 respectively represent a light source side surface and an optical disc side surface of the objective lens 1, surface #3 represents a protective layer surface of the multilayer high recording density optical disc D1, and surface #4 represents a position of a recording surface of the multilayer high recording density optical disc D1. In Table 2, "r" denotes the curvature radius (unit: mm) of each optical surface, "d" denotes the thickness of an optical component or the distance (unit: mm) from each optical surface to the next optical surface, "n (XX nm)" represents the refractive index at a wavelength in parentheses. For an aspherical surface, "r" represents the curvature radius on the optical axis. The thickness "d" of the surface #3 represents a protective layer thickness at which the design spherical aberration of the multilayer high recording density optical disc D1 becomes zero.

Each of the light source side surface (surface #1) and the optical disc side surface (#2) of the objective lens 10 is an aspherical surface. Each of the aspherical surfaces is optimally designed for the information recording or information reproducing for the optical disc D1. The following Table 3 shows the conical coefficients κ and aspherical coefficients $A_4, A_6 \ldots$ of each aspherical surface. In Table 3, the notation "E" means the power of 10 with an exponent specified by the number to the right of E (e.g. "E-04" means "$\times 10^{-4}$").

TABLE 3

| | Surface No. | |
|---|---|---|
| | 1 | 2 |
| κ | −1.40000E+00 | −3.85000E+01 |
| A4 | 1.60200E−01 | 4.01100E−01 |
| A6 | −1.68600E−02 | −8.71900E−01 |
| A8 | 2.99000E−02 | 7.43800E−01 |
| A10 | −3.03300E−02 | −7.62500E−02 |
| A12 | 1.53700E−02 | −2.02100E−01 |
| A14 | 1.94800E−02 | −1.49800E−01 |
| A16 | −2.78900E−02 | 7.47300E−01 |
| A18 | 1.14000E−02 | 2.24200E−01 |
| A20 | −2.17400E−03 | 5.54300E−02 |
| A22 | 1.58700E−03 | −2.34600E−01 |
| A24 | −9.65100E−04 | 6.01600E−02 |
| A26 | 0.00000E+00 | 0.00000E+00 |
| A28 | 0.00000E+00 | 0.00000E+00 |
| A30 | 0.00000E+00 | 0.00000E+00 |

Table 4 shows the remaining aberration (the $3^{rd}$ order coma CM3 and the $3^{rd}$ order astigmatism AS3) caused when the tilt angle adjustment is performed with the adjustment discs 26 having different thicknesses. The thicknesses t1 of the adjustment discs 26 are 0.050 mm, 0.070 mm, 0.075 mm, 0.0825 mm, 0.087 mm, and 0.100 mm. That is, six types of the adjustment discs 26 are used. In Table 4, "Coma Increasing Direction" (i.e., a direction in which a coma increases) is equal to the direction of the arrow C (see FIG. 3A) when the adjustment disc thicknesses t1 are 0.087 mm and 0.100 mm, and is equal to the direction of the arrow C' (see FIG. 3B) when the adjustment disc thicknesses t1 are 0.050 mm, 0.070 mm and 0.075 mm. In Table 4, "Coma Increasing Direction" (i.e., a direction in which a coma decreases) is equal to the direction of the arrow D (see FIG. 3A) when the adjustment disc thicknesses t1 are 0.087 mm and 0.100 mm, and is equal to the direction of the arrow D' (see FIG. 3B) when the adjustment disc thicknesses t1 are 0.050 mm, 0.070 mm and 0.075 mm. In Table 4, "CG thickness" represents the protective layer thickness of each recording layer of the multilayer high recording density optical disc D1 and a value shown in a column of "initial value" of "Lens Tilt (°)" is defined when the tilt angle is 0°. The aberration in a column for which the tilt angle is described shows a value obtained after completion of the tilt angle adjustment.

TABLE 4

| Condition | | | | | |
|---|---|---|---|---|---|
| Direction of | CG | | Lens Tilt (°) | Aberration (λrms) | |
| Off-axis Coma | thickness | Unit | Tilt Angle | CM3 | AS3 |
| Adjustment Disc 0.100 mm | | | | | |
| Coma | Initial Value | mm | Initial Value | 0.046 | 0.005 |
| Increasing | 0.1000 | | −0.747 | 0.000 | 0.052 |
| Direction | 0.0750 | | | −0.059 | 0.052 |
| | 0.0500 | | | −0.124 | 0.053 |
| Coma | Initial Value | mm | Initial Value | 0.014 | 0.005 |
| Decreasing | 0.1000 | | −0.233 | 0.000 | 0.000 |
| Direction | 0.0750 | | | 0.013 | 0.000 |
| | 0.0500 | | | 0.027 | 0.000 |
| Adjustment Disc 0.075 mm | | | | | |
| Coma | Initial Value | mm | Initial Value | 0.037 | 0.004 |
| Increasing | 0.1000 | | −0.354 | −0.007 | 0.000 |
| Direction | 0.0750 | | | 0.000 | 0.000 |
| | 0.0500 | | | 0.008 | 0.000 |
| Coma | Initial Value | mm | Initial Value | 0.023 | 0.005 |
| Decreasing | 0.1000 | | −0.217 | 0.033 | 0.013 |
| Direction | 0.0750 | | | 0.000 | 0.013 |
| | 0.0500 | | | −0.036 | 0.013 |
| Adjustment Disc 0.050 mm | | | | | |
| Coma | Initial Value | mm | Initial Value | 0.063 | 0.004 |
| Increasing | 0.1000 | | −0.401 | −0.010 | 0.000 |
| Direction | 0.0750 | | | −0.005 | 0.000 |
| | 0.0500 | | | 0.000 | 0.000 |
| Coma | Initial Value | mm | Initial Value | −0.002 | 0.005 |
| Decreasing | 0.1000 | | 0.013 | 0.047 | 0.005 |
| Direction | 0.0750 | | | 0.024 | 0.004 |
| | 0.0500 | | | 0.000 | 0.004 |
| Adjustment Disc 0.0825 mm | | | | | |
| Coma | Initial Value | mm | Initial Value | 0.030 | 0.004 |
| Increasing | 0.1000 | | −0.330 | −0.006 | 0.000 |
| Direction | 0.0750 | | | 0.003 | 0.000 |
| | 0.0500 | | | 0.011 | 0.000 |
| Coma | Initial Value | mm | Initial Value | 0.030 | 0.005 |
| Decreasing | 0.1000 | | −0.327 | 0.027 | 0.019 |
| Direction | 0.0750 | | | −0.012 | 0.019 |
| | 0.0500 | | | −0.054 | 0.019 |
| Adjustment Disc 0.070 mm | | | | | |
| Coma | Initial Value | mm | Initial Value | 0.042 | 0.004 |
| Increasing | 0.1000 | | −0.366 | −0.008 | 0.000 |
| Direction | 0.0750 | | | −0.001 | 0.000 |
| | 0.0500 | | | 0.006 | 0.000 |
| Coma | Initial Value | mm | Initial Value | 0.018 | 0.005 |
| Decreasing | 0.1000 | | −0.157 | 0.037 | 0.010 |
| Direction | 0.0750 | | | 0.007 | 0.010 |
| | 0.0500 | | | −0.027 | 0.010 |
| Adjustment Disc 0.087 mm | | | | | |
| Coma | Initial Value | mm | Initial Value | 0.034 | 0.005 |
| Increasing | 0.1000 | | −0.409 | 0.022 | 0.024 |
| Direction | 0.0750 | | | −0.021 | 0.024 |
| | 0.0500 | | | −0.067 | 0.024 |

TABLE 4-continued

| Condition | | | | | |
|---|---|---|---|---|---|
| Direction of | CG | | Lens Tilt (°) | Aberration (λrms) | |
| Off-axis Coma | thickness | Unit | Tilt Angle | CM3 | AS3 |
| Coma | Initial Value | mm | Initial Value | 0.026 | 0.004 |
| Decreasing | 0.1000 | | −0.312 | −0.005 | 0.000 |
| Direction | 0.0750 | | | 0.005 | 0.000 |
| | 0.0500 | | | 0.014 | 0.000 |

As shown in Table 4, the tilt angle of objective lens 4 is adjusted such that the $3^{rd}$ order coma CM3 becomes approximately zero at the protective layer thickness equal to the adjustment disc thickness t1 (see the examples of t1 0.050 mm, 0.075 mm and 0.100 mm). On the other hand, when the adjustment disc thicknesses are 0.070 mm, 0.0825 mm and 0.087 mm, the $3^{rd}$ order coma does not become zero at any protective layer thickness of the recording layer of the multilayer high recording density optical disc D1. However, the $3^{rd}$ order coma CM3 changes linearly with respect to the protective layer thickness. Therefore, by connecting the $3^{rd}$ order comas at the adjustment disc thicknesses t1 of 0.070 mm 0.0825 mm, and 0.087 mm by a line, it is understood that the $3^{rd}$ order coma CM3 becomes approximately zero at the protective layer thickness equal to the adjustment disc thickness t1 for each of the cases of the adjustment disc thicknesses t1 of 0.070 mm, 0.825 mm and 0.087 mm.

When the adjustment disc thicknesses t1 are 0.070 mm, 0.075 mm, 0.0825 mm and 0.087 mm, the condition (3) (or the condition (10) or (12)) is satisfied. As sown in Table 4, when the tilt angle adjustment is performed by selecting these adjustment disc thicknesses t1, the off-axis property becomes suitable in each of the recording layers of the multilayer high recording density optical disc D1 in all directions.

When the adjustment disc thicknesses t1 are 0.050 mm and 0.100 mm, the condition (3) (or the condition (10) or (12)) is not satisfied. Specifically, when the adjustment disc thickness t1 is 0.050 mm, (t1−t2) gets lower than the lower limit of the condition (3). In this case, the important property defined, at the protective layer thickness of 0.100 mm, when the direction of the off-axis light is equal to the direction of the arrow C' (see FIG. 3B) deteriorates. When the adjustment disc thickness t1 is 0.100 mm, (t1−t2) gets larger than the upper limit of the condition (3). In this case, when the direction of the off-axis light is equal to the direction of the arrow C (see FIG. 3A), the property defined at the protective layer thickness of 0.050 mm deteriorates largely. Since the recording layer of 0.100 mm is defined in all types of optical disc standards, optical discs having the recording layer of 0.100 mm are in widespread use. Since, between the protective layer surface and the recording layer of 0.100 mm, the multilayer high recording density optical disc D1 includes other recording layers, the property of the multilayer high recording density optical disc D1 tends to deteriorate due to an interlayer crosstalk.

Under such circumstances, it is necessary to put importance on the property at the protective layer thickness of 0.100 mm relative to the property at the protective layer thickness of 0.500 mm. Therefore, in the first example, the tolerance of aberration at the recording layer of 0.100 mm is defined as 0.040 λrms, and the tolerance of aberration at the recording layer of 0.050 mm is defined as 0.070 λrms. According to Marechal criterion, it is required to reduce the aberration to be larger than or equal to Strehl intensity of 0.8 (i.e., lower than or equal to 0.070 λrms). Therefore, for the recording layer of 0.050 mm, the acceptable aberration is set to the upper limit value. Regarding the recording layer of 0.100 mm, a margin of 0.030 λrms is secured with respect to Marechal criterion.

In the first example, the expected temperature during the tilt angle adjustment is the same as the design temperature (e.g., 35° C.) of the objective lens 1. It should be noted that, even when the temperature during the tilt angle adjustment is different from the design temperature, the accuracy of the tilt angle adjustment is not affected largely.

Although the present invention has been described in considerable detail with reference to certain preferred embodiments thereof, other embodiments are possible.

This application claims priority of Japanese Patent Application No. P2010-110256, filed on May 12, 2010. The entire subject matter of the application is incorporated herein by reference.

What is claimed is:

1. A method for adjusting a tilt angle of an objective lens with respect to one of a multilayer optical disc having a plurality of recording layers and an optical axis of an optical information recording/reproducing apparatus, wherein the apparatus emits a laser beam having a wavelength λ for the multilayer optical disc, the objective lens has a numerical aperture NA, and the wavelength λ and the numerical aperture NA satisfy the following conditions:

$$390 < \lambda < 420 \text{ and}$$

$$0.75 < NA < 0.90,$$

the method comprising:
selecting a predetermined transparent parallel plate to satisfy a condition $-0.015 < t1 - t2 < 0.005$
where t1 represents a thickness of the predetermined transparent parallel flat plate and t2 represents a design protective layer thickness at which a coma caused when off-axis light is incident on the objective lens becomes smallest, t1 and t2 having units of mm
determining the tilt angle of the objective lens by examining if a spot quality of the laser beam defined through the predetermined parallel plate matches a predetermined spot quality standard; and
tilting the objective lens to have the determined tilt angle based on the examining of the spot quality of the laser beam.

2. The method according to claim 1, further comprising:
observing, through the predetermined transparent parallel flat plate, a wavefront of light from the objective lens, wherein:
in the determining the tilt angle, the tilt angle is determined based on the observed wavefront;
in the tilting the objective lens, the objective lens is tilted to the determined tilt angle; and
the observing the wavefront, the determining and the tilting are repeated until the observed wavefront matches the predetermined standard.

3. The method according to claim 1, further comprising:
measuring, through the predetermined transparent parallel flat plate, a spot shape of a beam spot,
wherein:
in the determining the tilt angle, the tilt angle is determined based on the measured spot shape;
in the tilting the objective lens, the objective lens is tilted to the determined tilt angle; and
the measuring the spot shape, the determining and the tilting are repeated until the measured spot shape matches the predetermined standard.

4. The method according to claim 1, further comprising:
measuring a jitter through the predetermined transparent parallel flat plate,
wherein:
in the determining the tilt angle, the tilt angle is determined based on the measured jitter;
in the tilting the objective lens, the objective lens is tilted to the determined tilt angle; and
the measuring the jitter, the determining and the tilting are repeated until the measured jitter matches the predetermined standard.

5. The method according to claim 1,
wherein t1 and t2 satisfy a following condition:

$-0.015 < t1-t2 < 0.000$.

6. The method according to claim 1,
wherein when tmin represents a smallest protective layer thickness of all of protective layer thicknesses of the plurality of recording layers, and tmax represents a largest protective layer thickness of all of the protective layer thicknesses of the plurality of recording layers, t2 satisfies a following condition:

$tmin < t2 < tmax$.

7. The method according to claim 1,
wherein t1 and t2 respectively satisfy the following conditions:

$0.045 < t1 < 0.105$; and $0.060 < t2 < 0.100$.

8. The method according to claim 1,
wherein t1 and t2 respectively satisfy the following conditions:

$0.070 < t1 < 0.080$; and $0.065 < t2 < 0.095$.

9. The method according to claim 1,
wherein a coma component of a wavefront observed through the predetermined transparent parallel flat plate when the spot quality matches the predetermined standard is substantially equal to zero.

10. An optical information recording/reproducing apparatus that emits a laser beam having a wavelength $\lambda$ for a multilayer optical disc, the optical information recording reproducing apparatus comprising:
a light source which emits the light beam having the wavelength $\lambda$; and
an objective lens having a numerical aperture NA positioned at a tilt angle, the objective lens being configured to converge the light beam having the wavelength $\lambda$ onto each recording surface of the multilayer optical disc having a plurality of recording layers the wavelength $\lambda$ and the numerical aperture NA satisfy the following conditions:

$390 < \lambda < 420$ and $0.75 < NA < 0.90$, a tilt adjuster that is configured to select a predetermined transparent parallel plate to satisfy a condition $-0.015 < t1-t2 < 0.005$, where t1 represents a thickness of the predetermined transparent parallel flat plate and t2 represents a design protective layer thickness at which a coma caused when off-axis light is incident on the objective lens becomes smallest, t1 and t2 having units of mm, to determine the tilt angle of the objective lens by examining if a spot quality of the laser beam defined through the predetermined parallel plate matches a predetermined spot quality standard, and to tilt the objective lens to the determined tilt angle based upon the examination of the spot quality of the laser beam.

11. The optical information recording/reproducing apparatus according to claim 10,
further comprising a spherical aberration correcting element configured to correct a spherical aberration which varies depending on a difference in protective layer thickness between the plurality of recording layers of the multilayer optical disc.

12. The optical information recording/reproducing apparatus according to claim 11,
wherein the spherical aberration correcting element is a coupling lens which changes a diverging angle of the light beam having the wavelength $\lambda$ emitted by the light source by moving in an optical axis direction.

13. An optical information recording/reproducing apparatus that utilizes a multilayer optical disc having a plurality of recording layers, the apparatus comprising:
a light source which emits a light beam having a wavelength $\lambda$;
an objective lens configured to converge the light beam having the wavelength $\lambda$ onto each recording surface of the multilayer optical disc having a plurality of recording layers; and
a tilt adjuster is configured to adjust a tilt angle of the objective lens, and the following condition is satisfied: $-0.015 < t3-t2 < 0.005$, where t2 represents a design protective layer thickness at which a coma caused when off-axis light emitted by the light source and incident on the objective lens becomes smallest and t3 represents a protective layer thickness of the multilayer optical disc at which a coma caused when information recording or information reproducing is executed for the multilayer optical disc becomes smallest, and t2 and t3 have units of mm.

14. The optical information recording/reproducing apparatus according to claim 13,
wherein t2 and t3 satisfy a following condition:

$-0.015 < t3-t2 < 0.000$.

15. The optical information recording/reproducing apparatus according to claim 13,
further comprising a spherical aberration correcting element configured to correct a spherical aberration which varies depending on a difference in protective layer thickness between the plurality of recording layers of the multilayer optical disc.

16. The optical information recording/reproducing apparatus according to claim 15,
wherein the spherical aberration correcting element is a coupling lens which changes a diverging angle of the light beam having the wavelength $\lambda$ emitted by the light source by moving in an optical axis direction.

* * * * *